US007702671B2

(12) United States Patent
Jacobs et al.

(10) Patent No.: US 7,702,671 B2
(45) Date of Patent: Apr. 20, 2010

(54) SYSTEMS AND METHODS FOR DISCOVERY OF DATA THAT NEEDS IMPROVING OR AUTHORED USING USER SEARCH RESULTS DIAGNOSTICS

(75) Inventors: Nancy Ellen Jacobs, Redmond, WA (US); Simone Maillard, Seattle, WA (US); Zijian Zheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 11/118,749

(22) Filed: Apr. 29, 2005

(65) Prior Publication Data
US 2006/0248057 A1 Nov. 2, 2006

(51) Int. Cl.
G06F 7/00 (2006.01)
G06F 17/30 (2006.01)
G06F 15/16 (2006.01)

(52) U.S. Cl. .................. 707/705; 707/706; 707/708
(58) Field of Classification Search ............... 707/2–10; 705/14; 706/45
See application file for complete search history.

(56) References Cited

U.S. PATENT DOCUMENTS

| 6,643,639 | B2* | 11/2003 | Biebesheimer et al. ......... 707/3 |
| 6,829,599 | B2* | 12/2004 | Chidlovskii ..................... 707/3 |
| 7,007,074 | B2* | 2/2006 | Radwin ....................... 709/217 |
| 7,363,282 | B2* | 4/2008 | Karnawat et al. ............. 706/45 |
| 7,451,099 | B2* | 11/2008 | Henkin et al. ................. 705/14 |
| 2002/0085090 | A1* | 7/2002 | Kamen ......................... 348/61 |
| 2002/0152190 | A1* | 10/2002 | Biebesheimer et al. ......... 707/1 |
| 2003/0229537 | A1* | 12/2003 | Dunning et al. ............... 705/10 |
| 2004/0068486 | A1* | 4/2004 | Chidlovskii .................... 707/3 |
| 2005/0125390 | A1* | 6/2005 | Hurst-Hiller et al. ........... 707/3 |
| 2005/0144067 | A1* | 6/2005 | Farahat et al. ................. 705/14 |
| 2005/0222901 | A1* | 10/2005 | Agarwal et al. ............... 705/14 |
| 2005/0222981 | A1* | 10/2005 | Lawrence et al. .............. 707/3 |
| 2006/0149710 | A1* | 7/2006 | Koningstein et al. ........... 707/3 |

OTHER PUBLICATIONS

Claypool, M., et al., "Inferring user interest," *IEEE Internet Computing*, 2001, 5(6), 32-39.
Gamma, E., et al., "Gang of four," *Design Patterns: Elements of Reusable Object-Oriented Software*, 1994, Content pp. vii-ix.

* cited by examiner

Primary Examiner—Cam Y Truong
Assistant Examiner—Cecile Vo
(74) Attorney, Agent, or Firm—Merchant & Gould P.C.

(57) ABSTRACT

A search mechanism is evaluated or a relevance model checked using session level and result level diagnostics based on user behavior during a search session with respect to queries entered and user responses to result lists. Tracking occurs of when content desired by a user exists, but is not returned in a search result list when a query is made by the user with intent to find the desired content, when content desired by the user does not exist, when content desired by a user exists, but is not recognized by the user in a result list or is too low in a result list. A user's intent and search context is also taken into consideration when performing search mechanism diagnostics.

6 Claims, 5 Drawing Sheets

SYSTEMS AND METHODS FOR DISCOVERY OF DATA THAT NEEDS IMPROVING OR AUTHORED USING USER SEARCH RESULTS DIAGNOSTICS

CROSS REFERENCE TO RELATED APPLICATION

This patent application is related to U.S. patent application Ser. No. 10/727,444 filed Dec. 3, 2003 entitled "Search System Using User Behavior Data," and is hereby incorporated by reference in its entirety.

FIELD OF THE INVENTION

This invention relates in general to the field of data search and retrieval. More particularly, this invention relates to the use of user behavior data in data search and retrieval for performing diagnostics to improve the data available and search methods.

BACKGROUND OF THE INVENTION

Data on one or more computer systems may contain data useful for a user. However, the data may be too large for the user to find the data by direct examination of the data. Additionally, some parts of the data repository may contain information that is not accessible to the user. In many cases, in order to allow the user useful access to the data, a search mechanism is provided. The search mechanism allows a user to issue a search request (also termed a search query). The results are then returned for the user.

For example, a web-based search engine is a search mechanism which may be used to provide search access to information via a web-based search. The information may be a specific data repository, such as a database or other data collection. The information may also be an agglomeration of a number of different data repositories. Such a search engine may provide search access to information available from different information providers over a network, such as the Internet.

In a typical usage of a web search engine, the user enters a query, which is a set of search terms related to the type of content for which the user is searching. The query is transmitted to the search engine, which attempts to locate "hits"— i.e., content that is available on the Internet and that relates to the terms contained in the query. Generally, the search engine either has a database of web pages that are known to exist, or communicates with external "providers" who maintain such databases; the query is "scored" against items in these databases to identify the web pages that best match the query. A list of results is then generated, and these results are returned to the user's computer for display by the user's web browser.

Typically, the databases contain information such as: the Uniform Resource Locators (URLs) of web pages, the titles of the pages, descriptions of the pages, and possibly other textual information about the web pages. The user then reads the results and attempts to determine, based on the text contained in the results, whether the results correspond to what the user is looking for. Users may then attempt to retrieve the entire page correlating to a search result. In other contexts, search engines present results summarizing the pieces of data which may possibly be useful for a user.

The utility of the search engine is directly correlated to the quality of the results provided. In the best case, the most results presented to the user are presented in order of utility to the user on the result page.

Because the quality of the results is subjective, in order to determine what the quality of results are, the user's satisfaction must be determined. For example, a user can be allowed to use a search engine for a period of time and then orally interviewed by an interviewer to determine the user's satisfaction.

In the prior art, quality of individual web pages has been measured by obtaining explicit feedback from a user. At least one prior art web browser has attempted to obtain such explicit feedback from a user. This browser is described in a paper entitled "Inferring User Interest" by Mark Claypool, David Brown, Phong Le, Makoto Waseda in *IEEE Internet Computing* 5(6): 32-39 (2001). In this browser, different pages are displayed by the browser. Whenever the page being displayed by the browser is changed, a user evaluation of the page is requested from the user. User evaluations for a given page are collected, to determine whether users find that page valuable. In this browser, some implicit feedback is also maintained regarding each page, including data regarding the time spent on the page, mouse movements, mouse clicks, and scrolling time.

While this technique does gather user feedback, it has limited utility in situations in which users may have different needs for a page. For example, a user who is looking for information about books written by Douglas Adams may evaluate a page on his book *The Hitchhiker's Guide to the Galaxy* and give a high score for utility. However, another user who is looking for information on books about traveling cheaply may evaluate the same page and give it a low score. Thus the technique described will have limited utility in the wide variety of situations in which different users may have different needs, or even where a single user may have different needs for information at different times. In other words, the usefulness of this technique is limited because evaluation of each page is completely independent of the context in which the user arrived at the page and in order to ultimately improve the search process and provide more relevant data proper diagnostics based on the user behavior in context must be performed.

Thus, this technique has a limited value for evaluating the quality of a search engine and is hardly acting on improving the search engine or quantity and quality of the underlying content being searched for.

In view of the foregoing, there is a need for a system and method that overcomes the drawbacks of the prior art.

SUMMARY OF THE INVENTION

Systems and methods for analyzing user behavior data gathered from the user's session using a search mechanism are provided the method comprising. An act is performed selected from the group consisting of: tracking when content desired by a user exists, but is not returned in a search result list when a query is made by the user with intent to find the desired content, tracking when content desired by the user does not exist in which the user searched for said content by a query made by the user with intent to find the desired content, tracking when content desired by a user exists, but is not recognized by the user in a result list, and tracking when content desired by a user exists, but is so low in a result list that it falls below a set threshold.

The tracking comprises determining whether the user has accepted a search result within the session. Also, the results of the analyzing may be ordered by how often the content is identified as that which is tracked according to a certain criteria.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

User feedback (explicit and/or implicit) is collected along with the context for that feedback. This allows context-dependent evaluations of the quality of search mechanisms. If one search mechanism produces results which garner better feedback than a second search mechanism, it can be determined that the first search mechanism is more successful at finding results for a user.

Additionally, it can be used for other purposes. For example, a relevance model can be used to measure the effectiveness of a search system. A relevance model is a probabilistic model which attempts to model the useful of results obtained from a search. However, for such a model to itself be useful, it must be accurate. Feedback from actual users can be used to validate a relevance model by showing whether there is a correlation between the predicted utility of results (from the relevance model) and the actual utility of results (from user feedback).

Other uses may also be found for context-based user feedback monitoring. For example, the success of a sponsored link may be evaluated. If, for example, a sponsored link is returned as a search result, the determination of whether it is considered a high-quality search result may be useful for the sponsor of the link or for the search mechanism provider. Additional uses are also contemplated.

Context-based search mechanism user feedback is captured by tracking an event stream and following a state machine in order to determine the state of the user's interaction with the browser. This allows queries to be presented to the user in order to (1) track what state the interaction is in and (2) request explicit feedback from the user. Implicit feedback, such as the amount of time spent on a page, among other implicit feedback items, is also tracked. This feedback information allows a determination to be made of whether a search result was useful in the context of the original search. Once this data has been collected, it can be analyzed to determine the quality of the search mechanism used. It can also be used to test a relevance model and see if the predictions generated by the relevance model on the quality of the results generated match the actual quality of the results as shown in implicit and/or explicit user feedback. Various diagnostics are performed including session level and result-level diagnostics to determine needed improvements.

Thus, a means is provided for using collecting implicit end-user behavior within search systems to perform diagnostics for determining needed improvements and additional needed content.

Exemplary Computing Environment

Figure 1:
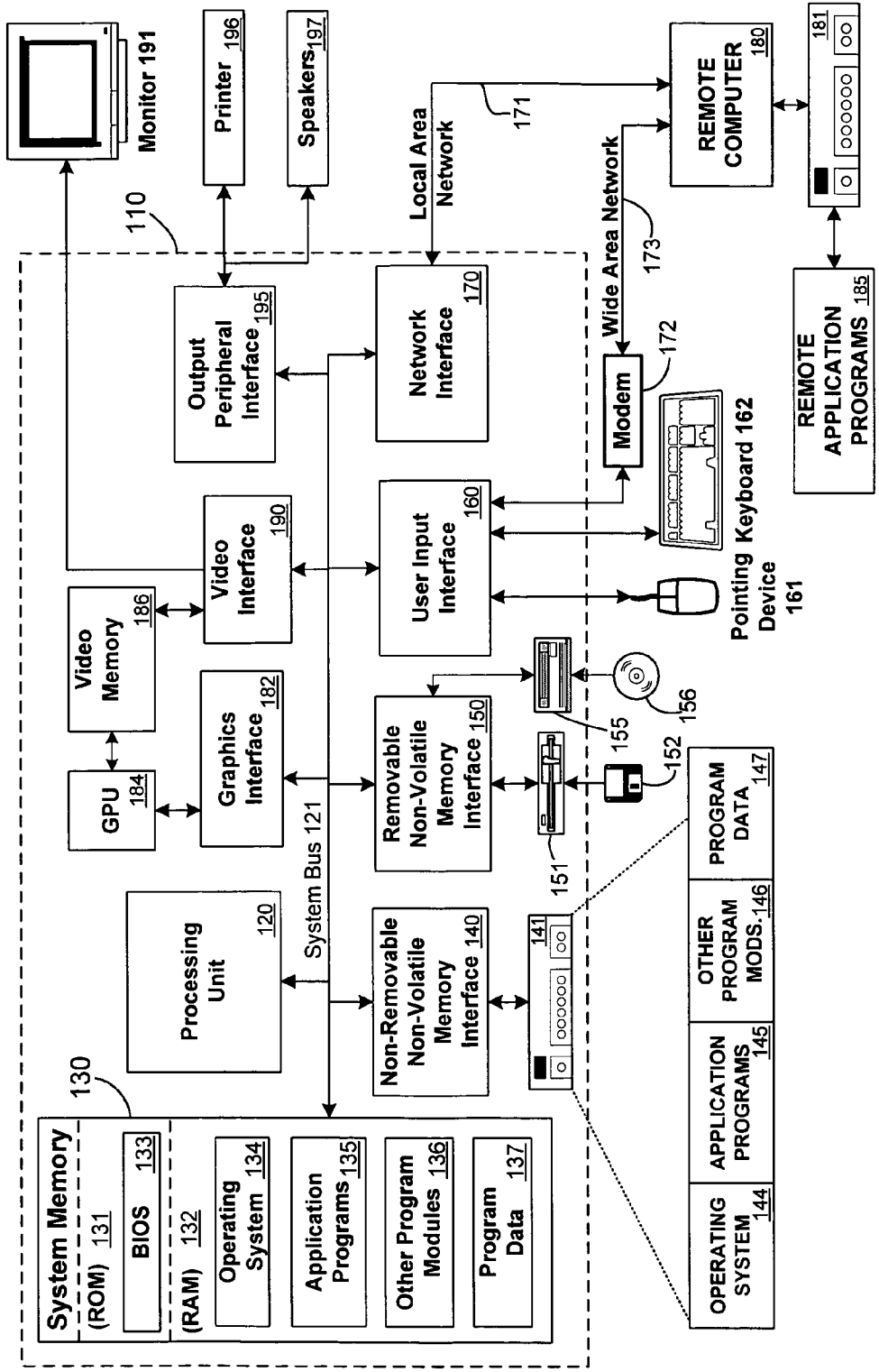
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable storage media implemented in any method or technology for storage of information such as computer readable instructions, data structures, program modules or other data. Computer storage media includes, but is not limited to, RAM, ROM, EEPROM, flash memory or other memory, CDROM, digital versatile disks (DVD) or other optical disk storage, magnetic cassettes, magnetic tape, magnetic disk storage or other magnetic storage devices, or any other storage medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Architecture

Figure 2:
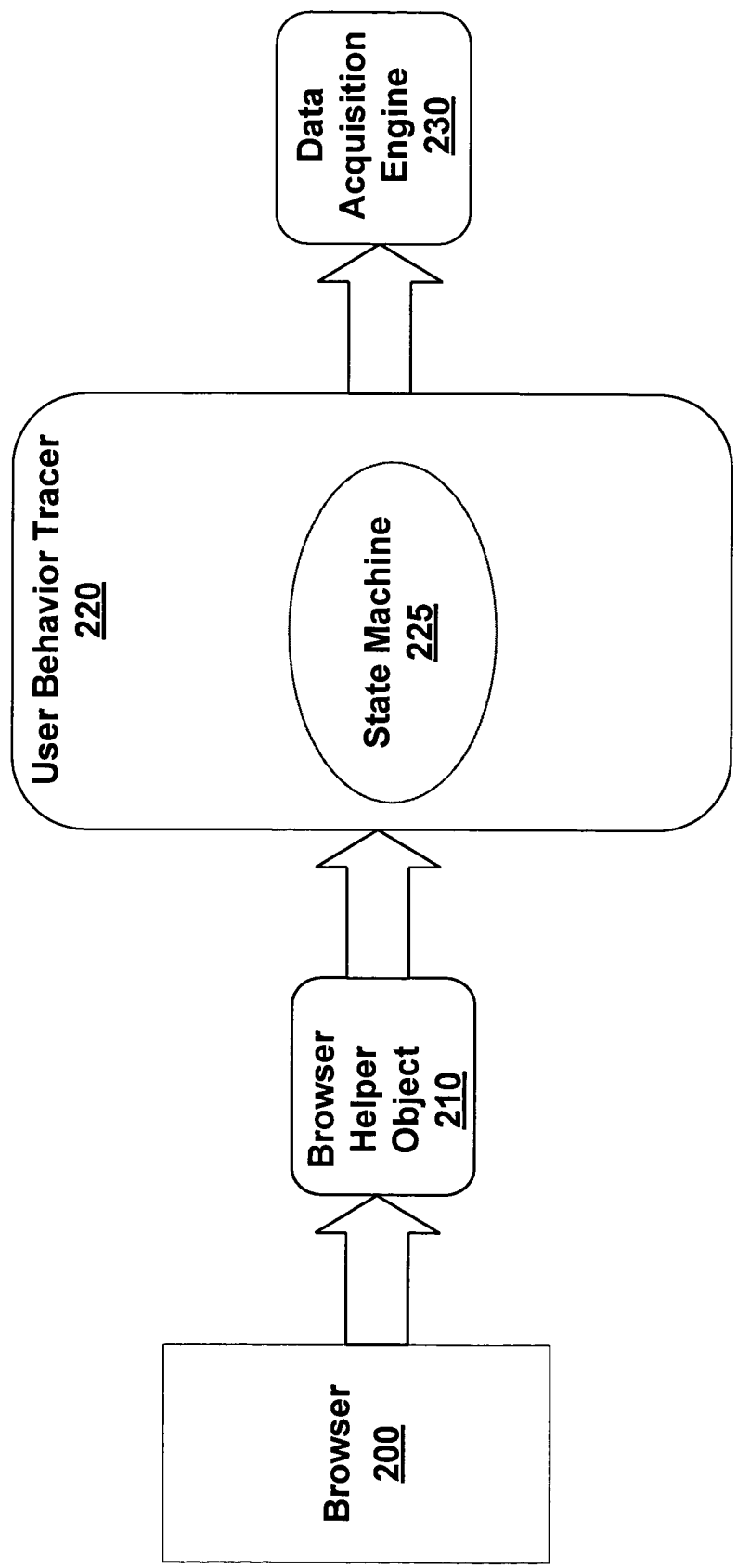
FIG. 2 is a block diagram of an example architecture for a system that collects context-based user behavior within a web browser.

FIG. 2 is a block diagram of an example architecture for a system that collects context-based user behavior within a web browser. However, it is important to note that the system that collects context-based user behavior can be applicable any client, not just a web browser. For example, this can be a client application on the local machine that connects to and queries a server. The browser, 200, is a web browser which the user interacts with. A browser helper object 210 interfaces with the browser 200, captures browser events, and send the events to a user behavior tracer 220. The core part of user behavior tracer 220 is state machine 225. The states of the state machine 225 represent the state of the user's interaction with browser 200. For example, one state may be associated with the user having initiated a search, but not yet received a result page. The state machine 225 receives events from user behavior tracer 220, tracks the state of the user's behavior as the user uses the browser 200, and collects implicit and explicit user feedback. The user behavior tracer 220 sends data regarding the search and the feedback to the data acquisition engine 230 which stores or processes the data.

In one embodiment, a Component Object Model (COM) or similar interface in browser 200 is used to allow an in-process COM server (or equivalent) to be developed which uses the interface in browser 200. This in-process COM server or equivalent is the browser helper object 210. The browser helper object 210 can, in one embodiment, be an in-process COM component registered under a certain registry key. When browser 200 is started, it looks up that registry key and loads the object whose class ID (CLSID) is stored there. (A CLSID is a globally unique identifier that identifies a COM class object.)

Browser helper object 210 detects the browser's typical events. In some browsers, events occur (are "fired") when certain situations occur. The detection of the event can signal that certain situations have occurred in the browser. For example, such events may include events which indicate the user's navigation from page to page, such as: (1) an event which fires when a hyper link has been clicked to navigate to a different page; (2) an event which fires when the history is used for navigation to a different page; (3) an event which fires when the address bar is used to navigate to a different page; and/or (4) an event which fires when the favorites list is used to navigate to a different page.

Additionally, such events may be include events which indicate the user's use of a displayed page, such as: (5) an event which fires when a document has been completely loaded and initialized (6) an event which fires when scrolling is taking place; (7) an event which fires when a document is printed; (8) an event which fires when a document is added to the favorites list; (9) an event which fires when the window gains focus; (10) an event which fires when the window loses focus; and/or (11) an event which fires when a window has been closed. Other events may also exist and may be detected by the browser helper object 210. Some of these events may not be available in some browsers 200, and some browsers 200 may require modification in order to provide functionality for detection of these browsers.

In addition to notification of the occurrence of the corresponding activity in the browser, these events in some cases also include information about the activity. For example, when a hyperlink has been clicked (event 1) the element which has been clicked is sent as a parameter in the event.

In addition to detecting these events which signal the user's pattern of navigation and the user's use of a displayed page, browser helper object 210 can also access the browser's menu and toolbar and install hooks to monitor messages and actions which are not reflected in events. In one embodiment, these hooks are used instead of the use of events as detailed above.

Once this information is captured by the browser helper object 210, it is passed to the user behavior tracer 220. The events are used in two ways. First, the event may be stored as or used to calculate implicit feedback data. Such implicit feedback may include: data regarding the time spent on the page, mouse movements, mouse clicks, scrolling time, and query text entered. Additionally, implicit feedback may include event date and time stamps, result positions on page, link text, result URL, result click-through, result dwell-time, result printed, result added to My Favorites, scrolling activity detected on result, and whether the result was a sponsored link.

In addition to the use of the data from the browser helper object 210 for implicit feedback, the data, in one embodiment, is also used to transition from one state to another or to trigger an event in the state machine. Events in the state machine include user queries for feedback (such as feedback on a specific result or on a query in general) and user queries for state (for example, when a modified search may or may not be part of a new query, the user may be asked whether the user intended to continue the same query or start a new query.)

As stated above, in order to enable context-dependent evaluations of results of search mechanisms, context data is tracked. In one embodiment, this context data includes the state of the search, behavior data regarding the user's use of the browser 200 and, responses to user queries as to the intent of the user's behavior. Along with context data, user feedback data, either implicit or explicit, is also tracked. In this way, the user feedback can be used to evaluate the quality of the search mechanism in the context of the search performed. Additionally, relevance models can be evaluated as described above.

The state machine 225 works to detect the contours of a search session—when it starts, when it finishes, and what occurs during the search session. State machine 225 tracks the possible states of a search—when the user has finished the evaluation of the particular result, when the user is done with a particular query, and when questions need to be asked of users, such as what feedback the user has on a particular result item or on the query as a whole. Similar events which are detected by the browser helper object 210 may mean different things, depending on what stage of the search session has been arrived at. In order to track this, in one embodiment, state machine 225 is used to handle the complexity of search events yet maintain flexibility. The state machine design pattern is a common pattern which can be implemented, for example, as detailed in the popular "Gang of Four" book entitled *Design Patterns: Elements of Reusable Object-Oriented Software* (Erich Gamma, Richard Helm, Ralph Johnson, and John Vlissides, Addison Wesley 1994.) Other implementations of state machine 225 are contemplated, as are other implementations of the user behavior tracer 220 which do not include a state machine.

State Machine

Figure 3:
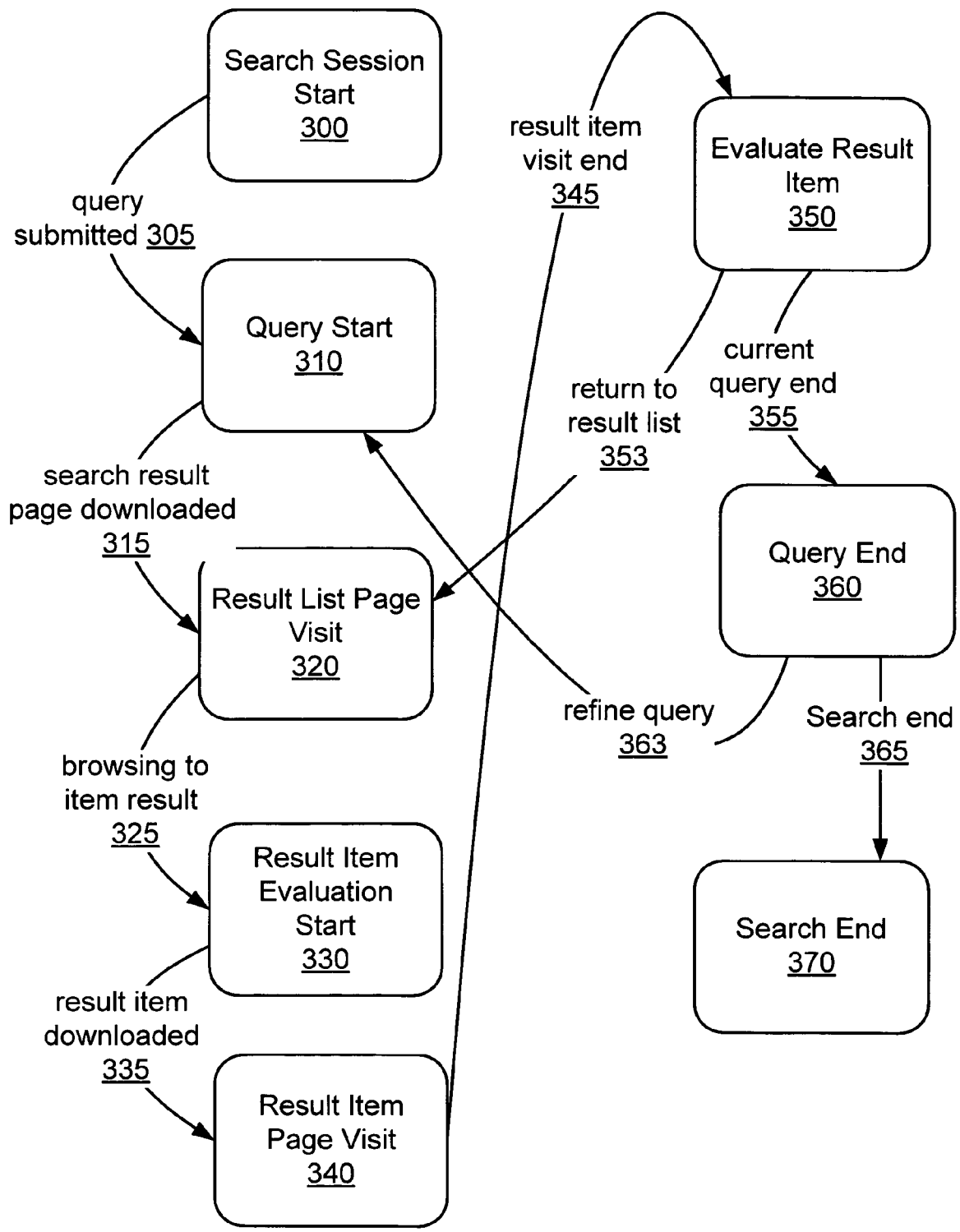
FIG. 3 is a diagram of a state machine of FIG. 2 that may be used to trace context-based user behavior.

FIG. 3 is a diagram of a state machine of FIG. 2 that may be used to trace context-based user behavior. The state machine first detects that a search session has been started (for example, by browsing with browser 200 to a page with search capabilities and then entering a search). The state machine tracks the progress of one search, which may consist of one query or a number of queries. Each search corresponds to a search intent, which may be carried through more than one query. The determination of whether two queries are part of the same search, in one embodiment, is left to the user through explicit feedback. In other embodiments, this is determined implicitly, for example by the similarities between the user's queries or the similarities in the results obtained.

When the data from the browser helper object 210 indicates that a search session is started, Search Session Start state 300 is entered. For example, this may occur when the user browses to a page with search mechanism capabilities. When and if data indicates that a query has been submitted (arrow 305), the Query Start state 310 is entered. The query submission to the search mechanism will result in a search result page being created at the search mechanism and downloaded by browser 200 (arrow 315). When this occurs, the state is transitioned to the Result List Page Visit state 320.

At this point, the user is looking at a page of results for the user's query. From this state, Result List Page Visit state 320, the user may do different things. For example, if the user is looking at page N of M result pages from the search mechanism, the user may decide to go to a different result page. If this occurs, the state remains in Result List Page Visit state 320.

In one embodiment, the possibility of the user having finished the search is tracked and the user may be queried if it appears the query has ended. For example, the amount of time spent in this state and/or the number of mouse clicks by the user is tracked, and if a click maximum threshold is exceeded or a timeout is encountered, the user is queried to determine if the user is still searching. If the user is not searching any more, a switch to an end state such as Query End state 360 or Search Session End state 370 is possible, as is an exit from the state machine, although these are not explicitly represented in FIG. 3. At any state, the user may close the browser or open a page unrelated to the search, and a switch to such an end state or exiting of the state machine is possible.

If the search is not timed out or exited, though, the user can select a result item from the result list to examine. When this browsing to the item result (arrow 325) occurs, the Result Item Evaluation Start state 330 is entered. When the requested item result is downloaded to the browser 200 (arrow 335), the Result Item Page Visit state 340 is entered. In this state, the user is examining a result item. While the user browses the result item, for example, going from a first page to a second page, the state remains Result Item Page Visit state 340. While in this state, again a timeout may result in a query to the user and an exit to an end state.

The user may indicate that that the user is done visiting the result item explicitly, if a timeout occurs. Additionally, there are other ways in which the user's actions may indicate that the user is done visiting the result item. For example, the user may browse back to the result list, close the browser, or enter a new page in the address bar. When it has been determined that the user is done visiting the result item (arrow 345), the Evaluate Result Item state is entered. In this state, the user is queried for explicit feedback on the result item. For example, the user may be asked to rate the quality or usefulness of the result item on a 5 point scale by selecting a radio button on a popup window on the user's display.

When this evaluation is over, if the user has browsed back to the result list (arrow 353), the state returns to Result List Page Visit state 320. If the user has not, that is an indication that the query has ended (arrow 355) and the Query End state 360 is entered. In this state, in one embodiment, the user is queried for explicit feedback regarding the quality or usefulness of the query results as a whole. If the user indicates that the user wishes to refine the query (for example, either explicitly in response to a query)(arrow 363) the state returns to Query Start 310. Otherwise, the current search has ended (arrow 365) and the Search End state 370 is entered. In this state, in one embodiment, the user is queried for explicit feedback regarding the quality or usefulness of the search as a whole. From here the state machine may be exited or, if a new search is begun, the state machine may be reentered at Search Session Start state 300.

While transitions are occurring between the various states of the state machine 225 and explicit feedback is being requested and stored, implicit feedback and other user behavior information is being captured as well. For example, while the user is in the Result List Page Visit state 320, the users result list page explore behavior is being stored.

If there is a timeout, in one embodiment, a flag is set for the timeout. This is done because many computer systems allow users to use several applications at once. If the user has switched to another application, such as reading email with an email application, and the timeout occurs, the user experience may be negative if a dialog box pops up on the screen to ask him if he is done with the search. Instead, the flag is set. Then, when the user behavior tracer 220 receives data regarding an event indicating that the user is again using browser 200 (for example, by receiving notice that a mouse move event has been fired by the browser 200) then the user may be prompted for the timeout question.

Other state machines are also contemplated. For example, state machines which request different explicit user feedback are generated by adding some more complicated transition cases. The state machine is able to handle quite complex scenarios, the complexity is well handled and controlled by the way the state machine is designed. Also additional state machines may be added intended to gather new categories of user feedback.

Data Recording

As discussed above, for each search, four types of data are acquired by the data acquisition engine 230 through the user behavior tracer 220.

(1) Query string that the user used during the search.

(2) Context Data: This can include data such as: the active applications running on the user's computer, hardware information, etc. Generally context data allows user feedback data to be analyzed in the context of what was occurring at the time of search.

(3) Implicit User Feedback Data: This data reflects user behavior throughout the search session, such as page browsing, scrolling, clicking, and other user behavior. In one embodiment, timing information is also stored to describe the user behavior (As detailed above, as well as being used for implicit user feedback, data regarding user behavior is also used along with other data to drive transitions between the states in the state machine.) This user behavior data is not necessarily the raw user behavior data stream sent by the browser helper object 210. In one embodiment, the raw data is interpreted and stored as four types of implicit user feedback data:

a) user behavior while visiting a result list page, including the time spent at that result;

b) user behavior while exploring a hyper link on the result list page, such as a search tip link, including the time spent at that result;

c) user behavior for visiting a result item page, including the time spent at that result and other actions such as scrolling, printing or adding the document to the user's favorites;

(in one embodiment, the active time spent at the result is measured in these three cases by subtracting any time in which the browser has lost user focus, for example when a user switches to another application)

d) Result item ignore records the user behavior for ignoring a result item, i.e. when the user does not visit a result item though it appears as part of a result list.

These correspond to some extent to states in the state machine 225, and the interpretation, in one embodiment, of raw data into interpreted user behavior data of these types occurs in the states of the state machine, while they are being traversed.

(4) Explicit User Feedback Data: This data is the explicit user feedback which has been requested about the result items the user visited and the query the user have submitted. For example, regarding a search, a query, or a specific result, the user may be asked, via a dialog box, "Did this answer your question?" and allowed to enter a response. As another example, regarding a specific result which the user ignored, the user may be asked "Why didn't you try this result?" and given choices including "I didn't think this would answer my question."

In one embodiment, explicit user feedback is requested as shown in the following Table 1, with the description of the situation which will prompt the request for explicit feedback detailed in the Description column and the contents for the dialog interaction presented to the user as shown in the Dialog column with bullets representing radio buttons.

TABLE 1

User Feedback.

| Description | Dialog |
| --- | --- |
| The user has finished evaluating a result item | Would you say that:<br>This result answered your question<br>This result somewhat answered your question<br>This result did not answer your question<br>You did not get a chance to evaluate this result (broken link, foreign language, etc.)<br>Other |
| The user exits a results list without exploring all results (the dialog will be presented about some or all of the results not visited, one dialog per result for which feedback is requested) | You did not visit this result because:<br>You didn't think it would answer your question<br>You've been to this result before<br>You didn't look at it<br>Other |
| A query has ended | For this query were you:<br>Satisfied with the query<br>Partially satisfied with the query<br>Not satisfied with the query |
| A search session has ended | For this search were you:<br>Satisfied with the search<br>Partially satisfied with the search<br>Not satisfied with the search |

The query data, user behavior data, and explicit user feedback data which is collected can be presented for examination, used to validate a relevance model, or used to measure the effectiveness of a search mechanism.

Figure 4:
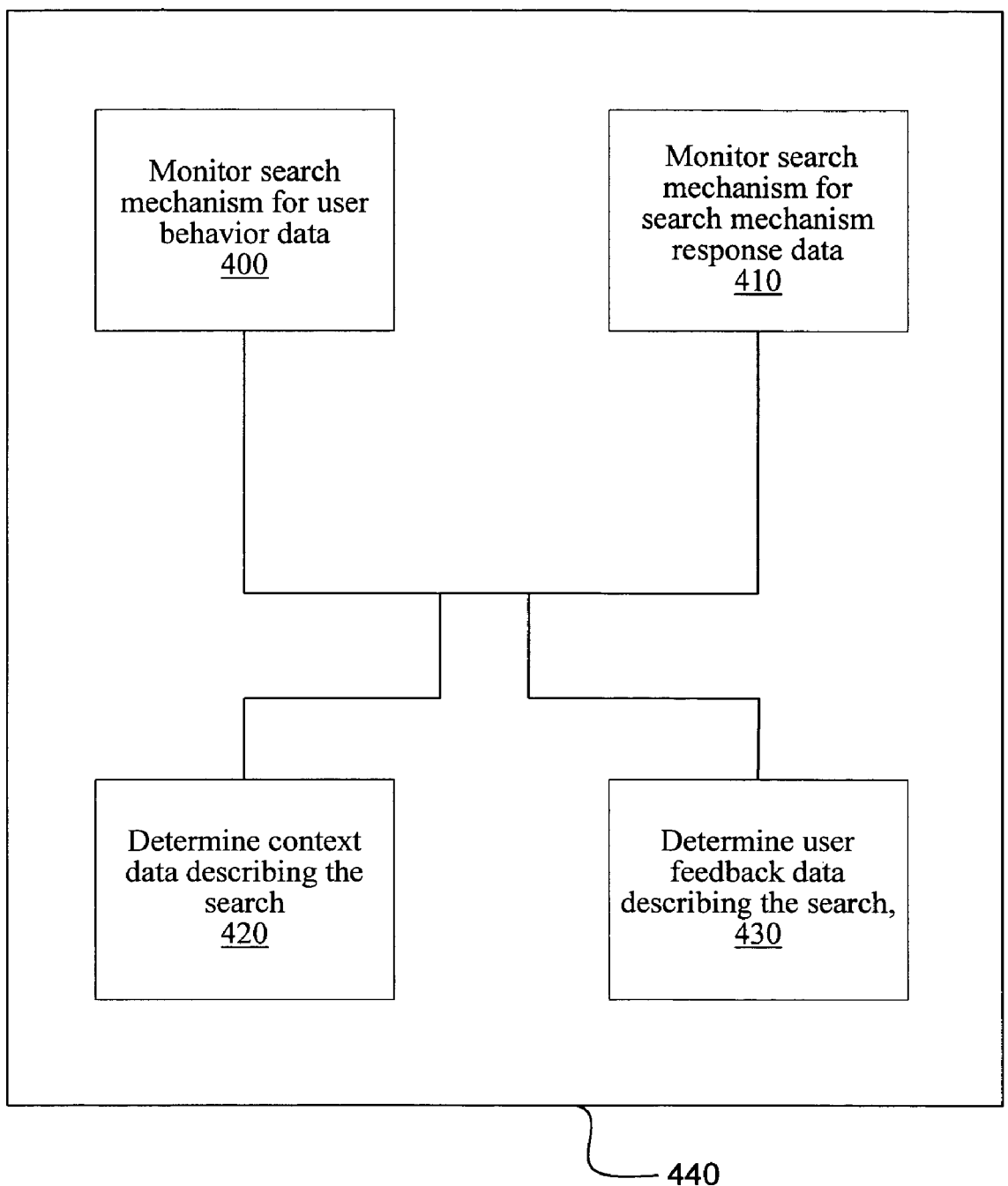
FIG. 4 is a flow diagram showing the process of gathering context-based feedback.

FIG. 4 is a flow diagram showing the process of gathering context-based feedback 440. In step 400, the search mechanism is monitored for user behavior data regarding a search. At the same time, in step 410, the search mechanism is monitored for search mechanism response data regarding the search. This data is used to determine context data describing the search and to determine user feedback data describing the search, steps 420 and 430.

Diagnostics

Figure 5:
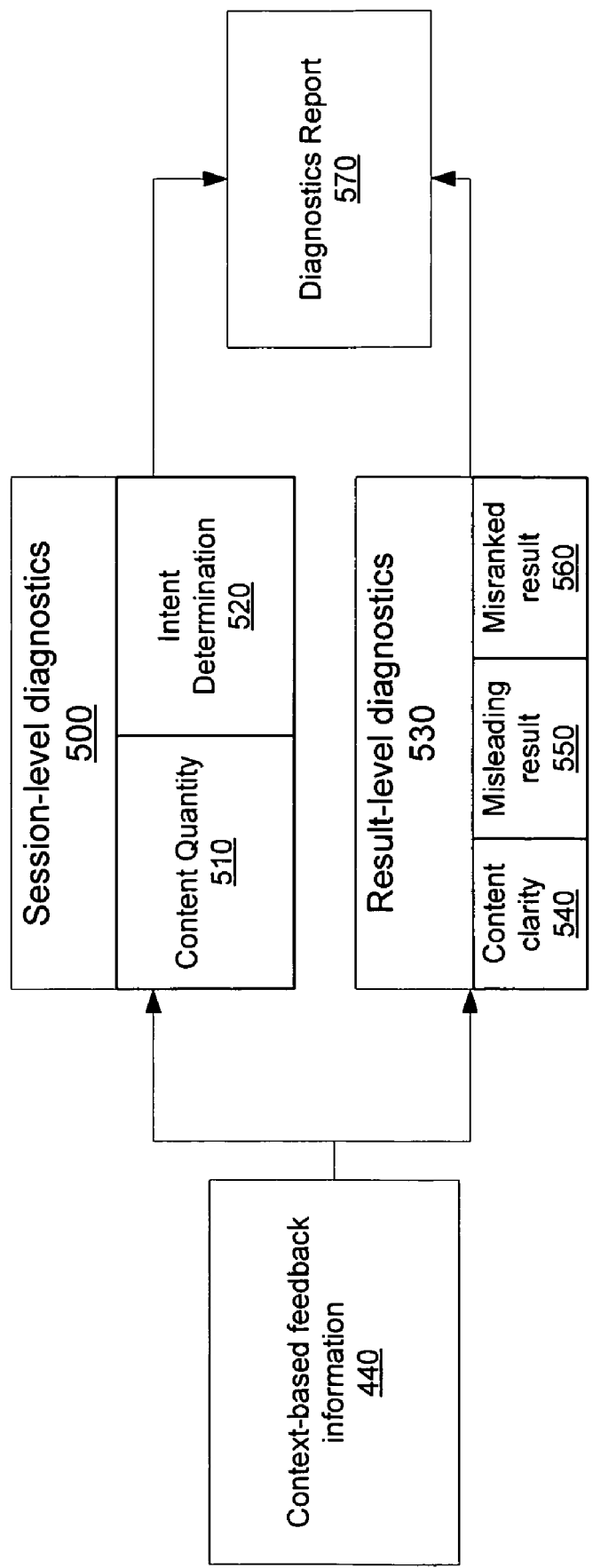
FIG. 5 is a block diagram of a search diagnostics system according to an aspect of the present invention.

Referring next to FIG. 5, shown is a block diagram of a search diagnostics system according to an aspect of the present invention. Session level diagnostics 500 and result-level diagnostics 530 are performed based preferably on context-based feedback information 440. This context-based feedback information 440 may, for example, be generated in a manner such as described herein and that shown in FIGS. 2-4. However other methods of collecting such information may also be used.

A relevance model may analyze user behavior data (e.g. query, re-query, click through, dwell time, etc) and surfaces (reports) predictions of user satisfaction and needed improvements (i.e., diagnostics). Relevance diagnostics are calculated at the Session level 500 (all queries entered by a user that represent a common intent) or the Result level 530 (e.g., asset-centric rather than query-centric). An asset is a content item returned by a search query.

The session-level diagnostics 500 analyze user behavior data during a session within the context of a user's intent. An "accept" occurs when there is an indication a user is satisfied with a result. Within a session, there are several reasons that a "no accept" by a user might occur:

1. The result exists, but is too low in the result list.
2. The result exists, but is unrecognizable to the customer.
3. The result exists but it isn't in the results list.
4. No result exists There are two session-level diagnostics: Content Quantity 510 and Intent Determination 520. Content Quantity 510 answers the question of: "What new assistance content should be provided?" by identifying queries for which there is no appropriate asset. Intent Determination 520 answers the question of: "What queries are failing to return assistance our customers value, when that assistance does exist?" by identifying queries that should return known good assets, but do not.

A given intent is surfaced to only one diagnostic. Intent Determination 520 and Content Quantity 510 problems are not surfaced for the same intent. To ensure this, intents that have recommended assets with a confidence score over a particular threshold will be surfaced in the Intent Determination 520 part of the diagnostics report 570. All other intents will appear in the Content Quantity 510 part of the diagnostics report 570. Instances of a diagnostic can be ordered by a single score from most severe to least severe and there is a threshold for severity (with a default value of 75%, for example) below which problems are not surfaced for each report. Also provided are which queries/intents that are failing (e.g., queries with click through but no accept or when multiple queries are made before an accept).

With respect to Content Quantity 510, information is provided to let a diagnostics report 570 user know if no assets are candidates to address a failed query. When a session does not end in an accept, the confidence that the issue is a content hole is lower for sessions with one query, rises with the number of re-queries to some pre-determined point and then stabilizes. For example, a session with 3 queries with no accept is much worse than a session with only one query. However, a session with 20 queries may not be much worse than a session with 10 queries. Also, the number of failed user search bundles (user searches related to each other in some fashion) that have 0 results returned is displayed in the diagnostics report 570.

With respect to Intent Determination 520, information is provided to let a diagnostics report 570 user know which assets are candidates to address failed queries. The diagnostics show how confident the system is that an asset is a good candidate to answer the queries or intent. The confidence that an asset addresses a failed query increases with the percentage of user sessions that end with an accept on that asset. The total number of 0-result user search bundles (USBs) within each intent that is linked to a listing of all the queries within that USB is displayed in the diagnostics report 570.

Result-level diagnostics 530 analyze user behavior in interaction with a result and in the context of a USB. There are three result-level diagnostics 530: Content Clarity 540, Misleading Result 550 and Misranked Result 560.

The Content Clarity diagnostic 540 identifies assistance that evokes divergent reactions from users who entered similar queries. That is, two users enter the same query and view the same asset, but one finds an answer to the query and one does not. Ordering assets by average rating tends to obscure the problem as the positive and negative responses cancel each other out. Information is provided to let the diagnostics report 570 user know which assets have divergent user responses. Only instances in which the percentage for a particular asset falling into neither the very satisfied (VSAT) category nor dissatisfied (DSAT) category are <40%, and in which VSAT+DSAT are >90% are surfaced. These values are configurable settings. There may also be other categories representing levels of satisfaction such as PSAT, for example, which represent a level between VSAT and DSAT. Instances of the diagnostic are ordered by a single normalized score from most severe to least severe and there is a threshold for severity below which problems are not surfaced called (with a default of 0.75, for example).

The Misleading Result 550 diagnostic identifies content that is frequently viewed and has high dissatisfaction, or content that has high satisfaction but is seldom viewed (e.g., low click through). The diagnostic is determined in the context of a query. Information is provided to let the diagnostics report 570 user know which assets are frequently viewed and have high dissatisfaction. Also, information is provided to let the diagnostics report 570 user know which seldom viewed content has high satisfaction. The diagnostics report user can drill down to see data on the problem assets. Instances of the diagnostic are be ordered by a single score from most significant (high click-through/low satisfaction) to most significant (low click-through/high satisfaction).

The following represent exemplary guidelines for which diagnostics are surfaced:

If the asset hit count is not in the top 50% of overall click-through, there is no high click-through.
  If the asset hit count is in the top 60% overall, there is no low click-through.
If PSAT>33% there is no high satisfaction.
If DSAT>0% there is no high satisfaction.
If VSAT=DSAT there is no low satisfaction.

The Misranked result 560 diagnostic indicates that the result is returned high in a list with low click-through or low in a list with high click-through. The search author's response to this diagnostic is to create best bets for results that are ranked too low.

Information is provided to let the diagnostics report user know which satisfactory results are returned low in a results list for a query, which dissatisfactory results are returned too high in the results list for a query (whether this is a criteria depends on what action the user can take in response), and how confident the system is that an result is a good candidate to move up or down in response to a USB. The diagnostic report 570 can also recommend what adjustment should be made to the result position (e.g., move up/down and by how much). The recommendation is presented in a way that is easy for users to understand. Whether this is a criteria depends on what action the user can take in response. Instances of the Misranked result 560 diagnostic is ordered by a single score from most severe to least severe. There is a threshold for severity below which problems are not surfaced. This will be gauged by a pre-determined default setting, or can be user-defined.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for analyzing user behavior data gathered from a user search session using a search mechanism, the method comprising:
  employing a processor executing computer executable instructions to implement the following acts:
    tracking user behavior data related to a failed query during the user search session, the tracking comprising monitoring whether:
      a content desired by a user exists, but is not returned in a search result list when a query is made by the user with intent to find the desired content,
      the content desired by the user does not exist in which the user searched for said content by the query made by the user with intent to find the desired content,
      the content desired by the user exists, but the content desired is not recognized by the user in the search result list,
      the content desired by the user exists, but the content desired is below a set threshold in the search result list, and
      the user has accepted the search result list within the search session, wherein a number of queries that took the user within the session to accept the search result list within the session is determined and only content that has been tracked over a threshold number of times due to falling within certain criteria is reported; and
    providing the user behavior data corresponding to whether the content desired by the user exists to an intent determination diagnostic that indicates the desired content exists for the failed query if a confidence score is over a threshold value, and providing the user behavior data corresponding to whether the content desired by the user does not exist to a content quantity diagnostic that indicates the desired content does not exist for the failed query if the confidence score is below the threshold value.

2. The method of claim 1 wherein the results of the analyzing are ordered by how often the content is identified as that which is tracked according to a certain criteria.

3. A method for analyzing user behavior data gathered from a user search session using a search mechanism, the method comprising:
  employing a processor executing computer executable instructions to implement the following acts:
    tracking implicit user behavior data when a user search session ends without indication of a satisfying search query result, the tracking comprising monitoring whether:
      a content desired by a user exists, but the content desired is not returned in a search result list when a query is made by the user with intent to find the desired content,
      the content desired by the user does not exist in which the user searched for said content by the query made by the user with intent to find the desired content,
      the content desired by the user exists, but the content desired is not recognized by the user in the search result list, the content desired by the user exists, but the content desired is below a set threshold in the search result list, and the user has accepted the search result list within the session, wherein a number of queries that took the user within the session to accept the search result list within the session is determined and only content that has been tracked over a threshold number of times due to falling within certain criteria is reported;

providing the implicit user behavior data corresponding to whether the desired content of the search query exists to an intent determination diagnostic that indicates the desired content exists if a confidence score is over a threshold value, and providing the implicit user behavior data corresponding to whether the desired content of the search query does not exist to a content quantity diagnostic that indicates the desired content does not exist if the confidence score is below the threshold value; and providing a diagnostic report with the intent determination diagnostic and the content quantity diagnostic for the user search session, wherein the diagnostic report identifies one or more results that are candidates for the desired content for the query made by the user that should have a search result with the desired content, and wherein the diagnostic report includes at least one of a content clarity diagnostic, a misleading result diagnostic, and a misranked result diagnostic, wherein content clarity diagnostic identifies results that evoked divergent results from a plurality of users submitting the same query, wherein the misleading result diagnostic identifies misleading results including at least one of results that are viewed frequently and have a high dissatisfaction, results that are viewed seldom and have high satisfaction are listed low in a ranked results list and have high click-through, and results that are listed high in a ranked results list have a low click-through, and wherein the misranked results diagnostic provides a recommendation for a results position for at least one misranked result.

4. A computer storage medium readable by a computer having a memory and a processor, the medium tangibly embodying one or more programs of instructions executable by the computer to implement steps for analyzing user behavior data gathered from a user search session using a search mechanism, comprising:

tracking user behavior data related to a failed search query during the user search session, the tracking comprising monitoring whether:

a content desired by a user exists, but the content desired is not returned in a search result list when a query is made by the user with intent to find the desired content, the content desired by the user does not exist in which the user searched for said content by the query made by the user with intent to find the desired content, the content desired by the user exists, but the content desired is not recognized by the user in the search result list, the content desired by the user exists, but the content desired is below a set threshold in the search result list, and the user has accepted the search result list within the session, wherein a number of queries that took the user within the session to accept the search result list within the session is determined and only content that has been tracked over a threshold number of times due to falling within certain criteria is reported;

providing the user behavior data corresponding to whether the content desired by the user exists to an intent determination diagnostic that indicates the desired content exists for the failed query if a confidence score is over a threshold value, and providing the user behavior data corresponding to whether the content desired by the user does not exist to a content quantity diagnostic that indicates the desired content does not exist for the failed query if the confidence score is below the threshold value; and generating a diagnostic report including the intent determination diagnostic and the content quantity diagnostic, wherein the diagnostic report identifies one or more results that are candidates for the desired content for the query made by the user that should have a search result with the desired content, and wherein the diagnostic report includes at least one of a content clarity diagnostic, a misleading result diagnostic, and a misranked result diagnostic, wherein content clarity diagnostic identifies results that evoked divergent results from a plurality of users submitting the same query, wherein the misleading result diagnostic identifies misleading results including at least one of results that are viewed frequently and have a high dissatisfaction, results that are viewed seldom and have high satisfaction are listed low in a ranked results list and have high click-through, and results that are listed high in a ranked results list have a low click-through, and wherein the misranked results diagnostic provides a recommendation for a results position for at least one misranked result.

5. The computer storage medium of claim 4, wherein the confidence score is based upon the number of queries in the user search session.

6. The computer storage medium of claim 4, further comprising tracking which content has divergent user responses to the content over a set threshold, said responses coming from multiple users.

* * * * *